UNITED STATES PATENT OFFICE.

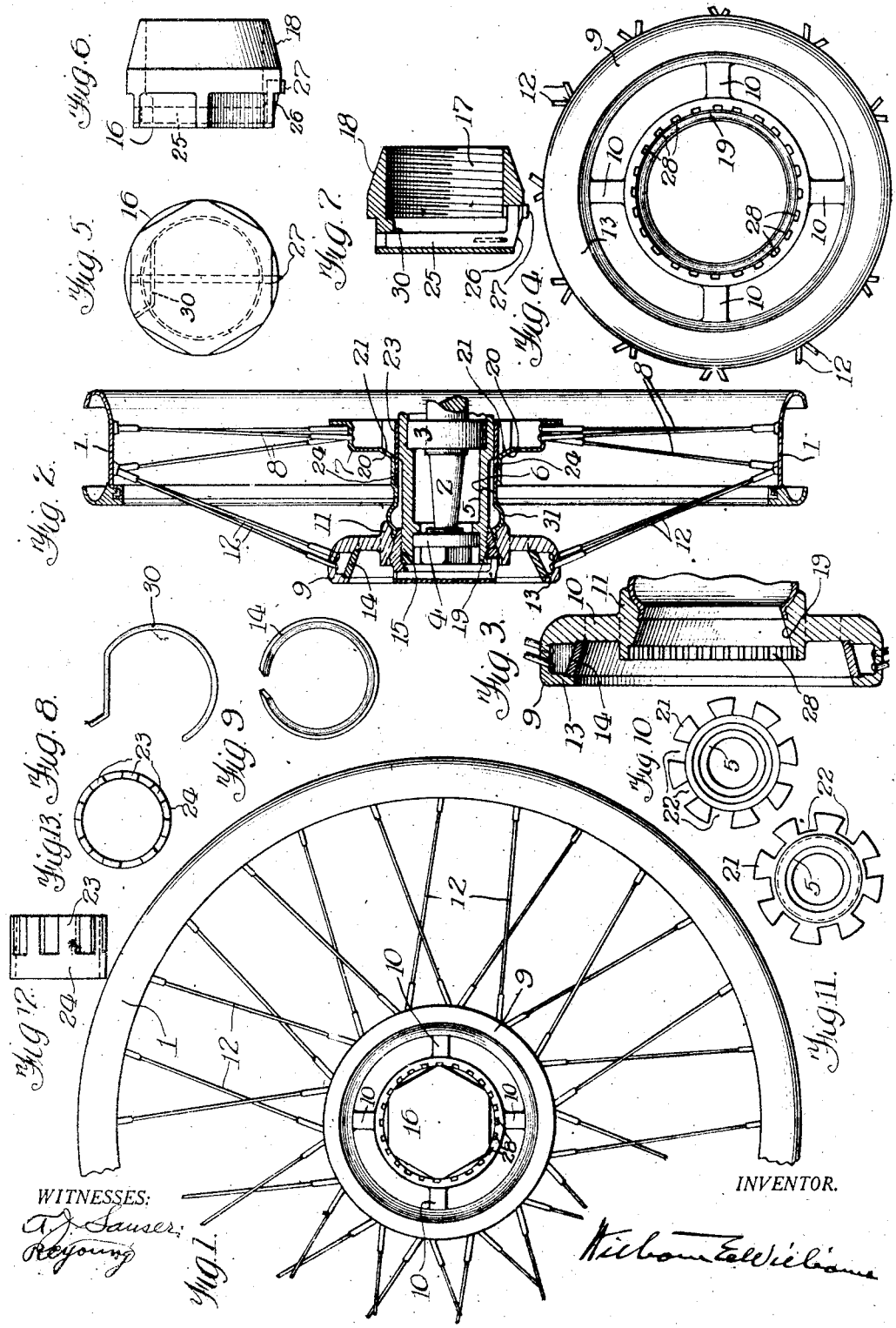

WILLIAM ERASTUS WILLIAMS, OF CHICAGO, ILLINOIS.

WIRE WHEEL.

1,338,410.

Specification of Letters Patent.  Patented Apr. 27, 1920.

Application filed May 5, 1917. Serial No. 166,577.

*To all whom it may concern:*

Be it known that I, WILLIAM ERASTUS WILLIAMS, a citizen of the United States, and a resident of Chicago, in the county of Cook and State of Illinois, have invented a new and useful Improvement in Wire Wheels, of which the following is a specification.

My invention relates to that class of wheels known as demountable wheels generally used for automobile purposes and also relates to the details of construction of wire wheels as will be shown and set forth herein.

The object of my invention is to increase the security of the fastenings of the demountable features, improve the arrangement of the wire spokes and to furnish a design that will lessen the cost of washing and keeping the wheel clean. The invention is set forth in the claims.

Reference will be had to the accompanying drawings in which:

Figure 1 is a front elevation of the wheel.

Fig. 2 is a vertical cross section.

Fig. 3 is an enlarged cross section of the front end of the hub.

Fig. 4 is a front elevation of the structure of Fig. 3.

Fig. 5 is a front view of the hub cap on a smaller scale than Figs. 3 and 4 and larger than Figs. 1 and 2.

Fig. 6 is a side view corresponding to Fig. 5.

Fig. 7 is a vertical section of Fig. 6.

Fig. 8 is a detail of the spring that holds the locking ratchet in place.

Fig. 9 is a plan of a covering strip or ring used to cover the ends of the spokes at the front of the hub, but on a smaller scale than the other figures.

Fig. 10 is the rear end of the axle hub.

Fig. 11 is the front end of the axle hub.

Fig. 12 is a side view of the locking ring.

Fig. 13 is an end view of the locking ring.

The general practice of manufacturing wire wheels heretofore for automobiles has been to use many spokes of rather small wire. When all the spokes that are necessarily attached to the front or outer end of the hub are attached as is the custom there is formed adjacent to the hub a net work of wire that gathers and holds dirt and is hard to wash.

In order to sustain the severe lateral shocks that a wheel encounters in use, the outside set of spokes are given a considerable incline that causes them to extend out near the end of the hub and in most cases the hub is made longer for wire wheels than with wooden wheels for this purpose of getting the inclination for the outside set of spokes.

By my construction I get the same inclination and at the same time shorten the length of the hub and get an arrangement of the front set of spokes that is more open and free and more easily washed than the old style wheels.

In the drawings 1 indicates the rim of the wheel which may be any ordinary rim of the class used on wire wheels. 2 indicates the vehicle axle and 3 the ball or roller bearing at the inside and 4 the bearing at the outer end of the axle. 5 indicates the ordinary hub in which the bearings are secured and which normally stays on the axle and I call it the axle or hub body.

6 indicates the hub sleeve or barrel of the hub of the demountable part of the wheel and it may be termed the demountable hub. This demountable hub is frequently made of a stamping. 7 indicates the rear flange of the hub barrel 6 which is of the ordinary design as relates to the fastening of the spokes therein and the latter are indicated by 8.

On the outer end of the barrel 6 I press and secure by welding or brazing a spoke socket wheel 9 provided with four spokes 10 integral with the ring 11 which is the part that is welded or brazed as mentioned to the hub barrel 6. An embossed rib 31 in the hub barrel 6 furnishes an abutment or shoulder to take the inward thrust of the ring 11 as part of ring 9. When castings are used for the hub barrel 6 I cast the spoke socket ring 9 integrally with the barrel.

The front set of spokes 12 are secured into a groove or socket 13 in the outer edge of the ring 9, thus causing them to terminate farther out from the center of the wheel than is the case with the present practice and at the same time obtain the same inclination for the spokes as is obtained when the hub is longer.

After the wheel is assembled I cover up the inner ends of the spokes 12 with a cover ring 14. This ring 14 when free is normally open wider than the cavity in the ring 9 in which it sits as is indicated by Fig.

9 and it is adapted to be sprung into its place covering the groove 13 and to stay in place by its own spring effect.

The outer end of the axle hub 5 is threaded at 15 adapted to receive the female thread 17 of the screw cap 16.

The cap 16 has a tapered end 18 adapted to wedge against the tapered hole 19 of the ring at the front end of the hub.

As a cap 16 is screwed on the axle hub it presses the hub barrel 6 backward or inward putting the shoulder or inclined surface 20 of the hub barrel up against the inclined end 21 of hub 5, thus holding the demountable wheel securely in place on the axle hub.

The inclined end 21 of the hub 5 is mutilated or notched as is indicated by 22. A ring 24 which is secured on the inside of the hub barrel 6 is provided with projections 23 which engage the notches 22 of hub 5 and thus lock the demountable hub 6 against rotation on the axle hub 5. The ring 24 is pressed tightly to the hub barrel 6 and is also secured therein by spot welds or rivets as desired.

The ring 24 is cheaply made and it costs practically nothing to shape the hub barrel 6 to receive this ring.

The cap or nut 16 is locked against accidental displacement by a locking bolt or bar composed of a flat bar 25 mounted to slide in slots in the walls of the cap as indicated in Figs. 5 to 7. The bar 25 has an inclined portion or wedge shaped end which extends out through the hub cap at a point where the wrench is applied and it extends over and terminates in a point 27 which may be termed a pawl. The bar 25 with its point 27 is held in engagement with notches or ratchet teeth 28 at the front end of the hub or in this case is in the ring 11. A spring 30 engages the bar 25 and holds it with its point 27 normally in engagement with the notches 28.

When the wrench is applied either to put on or remove the cap 26 it pushes the bar 25 with its point 27 into a retracted position freeing the point 27 from engagement with the notches 28, and thus the cap is readily applied or removed by means of a wrench.

What I claim is:

1. The combination with a hub body, of a body-inclosing sleeve having its outer integral end portion increased in diameter and internally grooved to form an annular recess open only upon the side toward the hub's axis and adapted to receive spoke heads, and a removable annular member filling the inner portion of the groove and concealing the groove and spoke heads therein without destroying the flanged appearance.

2. In a wheel of the class described a grooved ring on the front end of the hub into which groove the ends of the front spokes terminate, a cover ring or plate adapted to be sprung into the groove of the ring and form a cover therefor.

Signed at Chicago, in the county of Cook and State of Illinois, this second day of May, 1917.

WILLIAM ERASTUS WILLIAMS.

Witnesses:
H. M. ATHERTON,
ALBERT J. SAUSER.